United States Patent [19]
Nord

[11] Patent Number: 5,600,793
[45] Date of Patent: Feb. 4, 1997

[54] METHOD AND SYSTEM OF BI-DIRECTIONAL PARALLEL PORT DATA TRANSFER BETWEEN DATA PROCESSING SYSTEMS

[75] Inventor: Joseph H. Nord, Lighthouse Point, Fla.

[73] Assignee: International Business Machines Corporation, Armonk, N.Y.

[21] Appl. No.: 359,505

[22] Filed: Dec. 20, 1994

[51] Int. Cl.⁶ .............................. G06F 15/16; G06F 13/00
[52] U.S. Cl. ........................................ 395/200.01; 395/821
[58] Field of Search ........................... 395/200.01, 200.2, 395/200.14, 200.15, 285, 306, 800, 821; 370/17, 85.1, 60, 94.1; 371/33

[56] References Cited

U.S. PATENT DOCUMENTS

| | | | |
|---|---|---|---|
| 4,446,459 | 5/1984 | Bond, Jr. et al. | 340/825.21 |
| 4,584,684 | 4/1986 | Nagasawa et al. | 371/33 |
| 4,689,785 | 8/1987 | Toyonaga et al. | 370/85.3 |
| 4,710,871 | 12/1987 | Belknap et al. | 395/200.14 |
| 4,803,685 | 2/1989 | Oget | 371/33 |
| 4,870,639 | 9/1989 | Hayashi et al. | 370/60 |
| 5,133,055 | 7/1992 | Lieberman et al. | 395/889 |
| 5,170,469 | 12/1992 | Sako et al. | 395/854 |
| 5,187,795 | 2/1993 | Balmforth et al. | 395/800 |
| 5,239,627 | 8/1993 | Beck et al. | 395/892 |
| 5,299,314 | 3/1994 | Gates | 395/200.2 |
| 5,303,349 | 4/1994 | Warriner et al. | 395/882 |
| 5,313,594 | 5/1994 | Wakerly | 395/285 |
| 5,317,501 | 5/1994 | Hilpert | 364/132 |
| 5,438,671 | 8/1995 | Miles | 395/200.01 |
| 5,457,785 | 10/1995 | Kikinis et al. | 395/308 |

OTHER PUBLICATIONS

IBM Technical Disclosure Bulletin, vol. 30, No. 5, Oct. 1987 "Byte–Wide Bi–Directional Personal Computer Parallel Port Communication Interface".
IBM Technical Disclosure Bulletin, vol. 35, No. 6, Nov. 1992 "Parallel Port Addressing for Personal Computers".
IBM Technical Disclosure Bulletin, vol. 32, No. 10B, Mar. 1990 "Simple PC Printer Port FPROM Programmer".

*Primary Examiner*—Gopal C. Ray
*Attorney, Agent, or Firm*—Mark S. Walker; Andrew J. Dillon

[57] ABSTRACT

A method and system are described for bi-directional data transfer between a parallel port of a first (sending) data processing system and a parallel port of a second (receiving) data processing system. The process begins by signaling the sending data processing system that the receiving data processing system is ready to receive data. The sending data processing system then transmits a first packet of data to the receiving data processing system in conjunction with an indication that the first packet of data is valid to read. After reading the first packet of data, the receiving data processing system acknowledges receipt of the first packet of data by transmitting a signal to the sending data processing system. In response to the acknowledgment signal, the sending data processing system transmits a subsequent packet of data to the receiving data processing system in conjunction with an indication that the first packet of data is no longer valid to read. By transmitting the subsequent packet of data and the data invalid signal in a single output operation to the parallel port, the present invention increases the throughput of the data transfer while maintaining data integrity.

9 Claims, 7 Drawing Sheets

| PIN | IN/OUT | PIN NAME |
|---|---|---|
| 1 | N/A | STROBE |
| 2 | OUT | DATA0 |
| 3 | OUT | DATA1 |
| 4 | OUT | DATA2 |
| 5 | OUT | DATA3 |
| 6 | OUT | DATA4 |
| 7 | OUT | DATA5 |
| 8 | OUT | DATA6 |
| 9 | OUT | DATA7 |
| 10 | IN | ACK |
| 11 | IN | BUSY |
| 12 | IN | PE |
| 13 | IN | SLCT |
| 14 | OUT | AUTO FD |
| 15 | IN | ERROR |
| 16 | OUT | INIT |
| 17 | OUT | SLCT |
| 18-25 | N/A | GROUND |

*Fig. 3B*

25-Pin D-Shell Connector (Male)

*Fig. 3A*

| Description | PIN | Direction | PIN | Description |
|---|---|---|---|---|
| DATA0 | 2 | ↑ | 15 | STATUS3 |
| DATA1 | 3 | | 13 | STATUS4 |
| DATA2 | 4 | | 12 | STATUS5 |
| DATA3 | 5 | | 10 | STATUS6 |
| DATA4 | 6 | | 11 | STATUS7 |
| STATUS3 | 15 | ↓ | 2 | DATA0 |
| STATUS4 | 13 | | 3 | DATA1 |
| STATUS5 | 12 | | 4 | DATA2 |
| STATUS6 | 10 | | 5 | DATA3 |
| STATUS7 | 11 | | 6 | DATA4 |

METHOD AND SYSTEM OF BI-DIRECTIONAL PARALLEL PORT DATA TRANSFER BETWEEN DATA PROCESSING SYSTEMS

BACKGROUND OF THE INVENTION

1. Technical Field

The present invention relates in general to a method and system for improved data processing, and in particular to a method and system for improved data transfer between data processing systems. Still more particularly, the present invention relates to a method and system for efficient bi-directional parallel port data transfer between data processing systems.

2. Description of the Related Art

Since the advent of personal computer systems, personal computers (PCs) have been equipped with one or more parallel ports. Initially, the parallel port of a PC was designed to provide an efficient means of unidirectional data transfer to a local printer. IBM PCs and compatible data processing systems utilize a standard parallel port, which includes 8 data lines and 5 status lines. Because the standard parallel port was originally conceived to serve solely as an interface to a printer or other similar peripheral device, the data flow was designed to be unidirectional—from the PC to the printer. Consequently, early PCs were equipped with unidirectional parallel ports, within which the 8 data lines were write-only and the 5 status lines were read-only. With write-only data lines, a PC could not receive data via the parallel port.

More recently, interest has developed in bi-directional data transfer between data processing systems. For example, a user with both a lap top or portable computer and a desk top PC may wish to transfer files or other data between the two systems. In response to this apparent need, manufacturers have developed a host of hardware and software enhancements to PCs which enable bi-directional data transfer between the parallel ports of two data processing systems. One well-known hardware and software standard which enables bi-directional parallel port data transfer is the Enhanced Parallel Port (EPP), developed by Intel in conjunction with Zenith and Xircom. Although the EPP is compatible with most PCs since it utilizes the same 25-pin D-shell connectors as standard parallel ports, the EPP requires the use of an Intel EPP-compatible chipset. Utilizing the additional features provided by the Intel EPP-compatible chipset, operation of the parallel port is controlled by software via a so-called "fast parallel port control register." This system for bi-directional parallel port data transfer has been adopted as IEEE Standard 1248.

Manufacturers have also developed software packages, such as Lap Link by Traveling Software, which enable bi-directional data transfer between the parallel ports of data processing systems without requiring additional hardware. Although software-based methods of data transfer are easily implemented, software-based methods of bi-directional parallel port data transfer are often slow compared to the processor clock rate of the data processing systems due to the slow execution speed of input and output operations to the standard parallel port. If, for example, an IBM PC/AT is transferring data to a data processing system utilizing a PowerPC RISC processor, the speed of the transfer is determined by the rate at which the IBM PC/AT can output the data. Since the "in" and "out" instruction utilized to control the PC parallel port are tied to the 8 MHz clock rate of the IBM PC/AT ISA standard bus, the rate of data transfer will be slow as compared to the execution speed of the controlling software executing within the IBM PC/AT processor, and particularly slow as compared to the operating speed of a PowerPC processor-based system.

Although algorithms which enable data transfer between data processing systems with differing speeds require a minimum number of port I/O operations to transfer the data and to synchronize the two data processing systems, prior art algorithms utilize a greater number of port I/O operations than are necessary. Consequently, it would be desirable to provide a method and system for efficient bi-directional parallel port data transfer which require no additional or replacement hardware and which minimize the number of port I/O operations.

SUMMARY OF THE INVENTION

It is therefore one object of the present invention to provide an improved method and system for data processing.

It is another object of the present invention to provide an improved method and system for data transfer between data processing systems.

It is yet another object of the present invention to provide an efficient method and system for bi-directional parallel port data transfer between data processing systems.

The foregoing objects are achieved as is now described. A method and system are disclosed for bi-directional data transfer between a parallel port of a first (sending) data processing system and a parallel port of a second (receiving) data processing system. The process begins by signaling the sending data processing system that the receiving data processing system is ready to receive data. The sending data processing system then transmits a first packet of data to the receiving data processing system in conjunction with an indication that the first packet of data is valid to read. After reading the first packet of data, the receiving data processing system acknowledges receipt of the first packet of data by transmitting a signal to the sending data processing system. In response to the acknowledgment signal, the sending data processing system transmits a subsequent packet of data to the receiving data processing system in conjunction with an indication that the first packet of data is no longer valid to read. By transmitting the subsequent packet of data and the data invalid signal in a single output operation to the parallel port, the present invention increases the throughput of the data transfer while maintaining data integrity.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
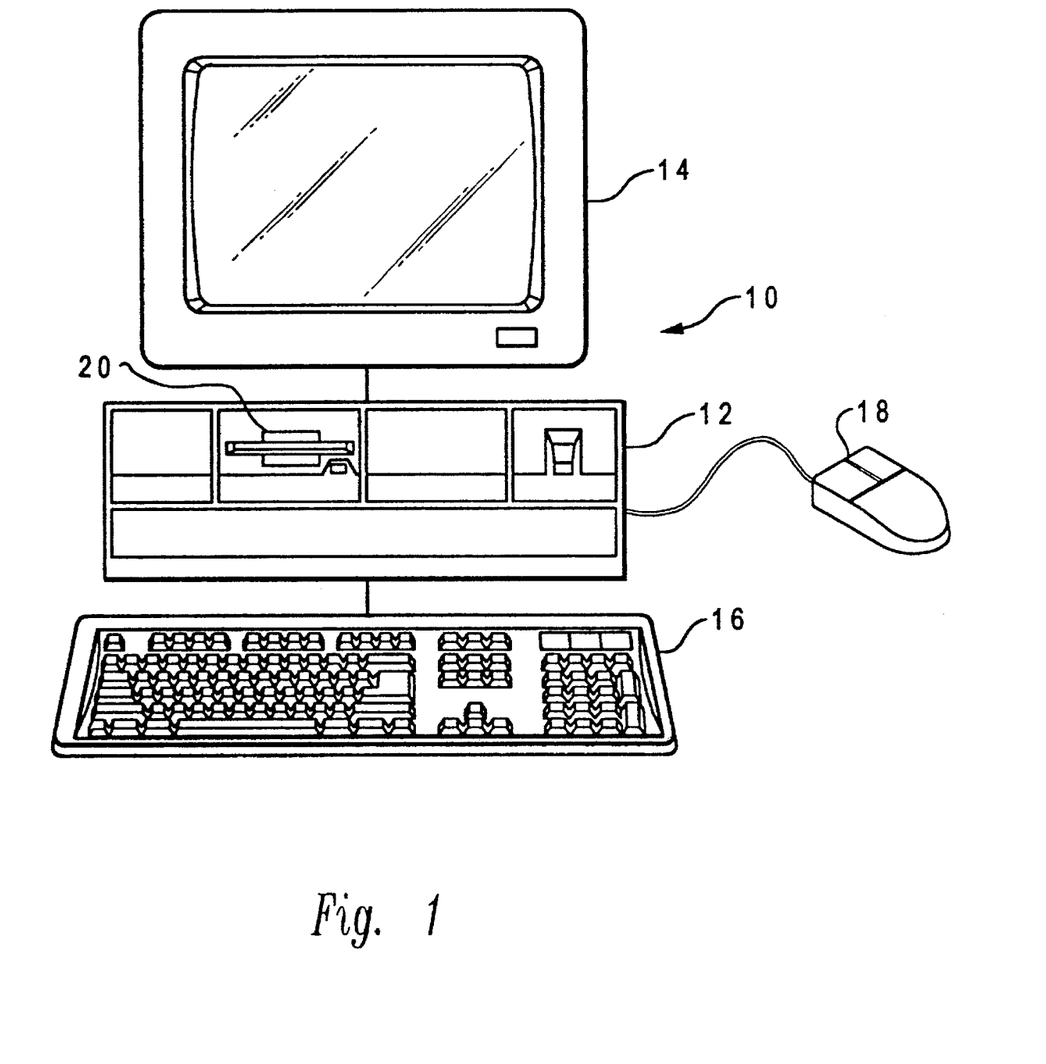
FIG. 1 illustrates a data processing system equipped with a standard parallel port according to the method and system of the present invention.

With reference now to the figures and in particular with reference to FIG. 1, there is illustrated a data processing system utilizing the improved method and system for parallel port data transfer of the present invention. As illustrated, data processing system 10 includes processing unit 12, display device 14, keyboard 16, and mouse 18. As is well-known in the art, a user may input data to processing unit 12 utilizing keyboard 16 or mouse 18. Processing unit 12 outputs data to a user via display device 14.

In a preferred embodiment in which processing unit 12 comprises an IBM-compatible personal computer, processing unit 12 includes a microprocessor, a system bus, 3 input/output (I/O) ports, a memory, disk drive 20, and a standard parallel port accessible at the rear surface of processor unit 12 (not illustrated). As is understood by those skilled in the art, parallel port data transfer is performed under the control of software executing within the processor. Typically, the processor loads data from either memory or disk drive 20 and stores the data to an address associated with one of the three I/O ports. The data is then transmitted via the system bus to a parallel port adaptor which drives the data on the pins of the standard parallel port corresponding to the selected I/O port.

Figure 2:
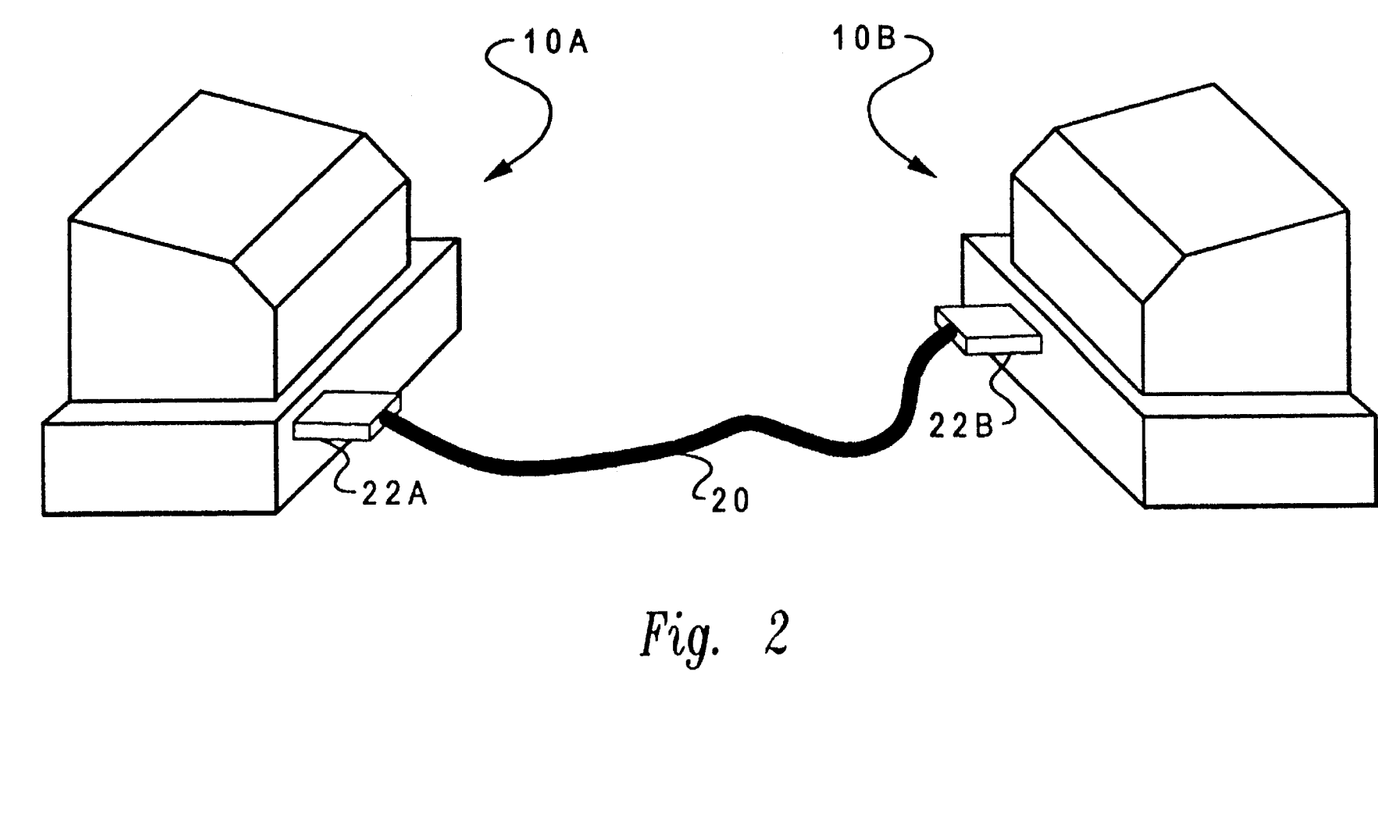
FIG. 2 depicts the connection between the parallel ports of two data processing systems according to the method and system of the present invention.

Referring now to FIG. 2, two data processing systems coupled according to the method and system of the present invention are depicted. As illustrated, the parallel port of data processing systems 10A and 10B are electrically connected utilizing a standard printer cable 20. Printer cable 20 includes 25-pin D-shell connectors 22A and 22B. The depicted arrangement enables bi-directional data transfer between data processing systems 10A and 10B via printer cable 20 without requiring add-on or replacement hardware.

Figure 3A:
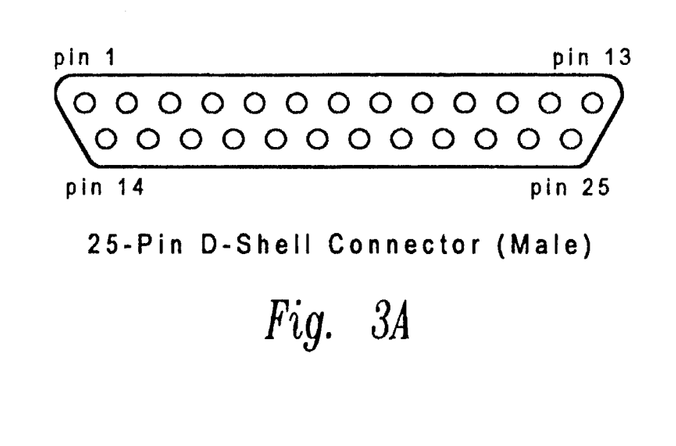
FIGS. 3A and 3B illustrate a representation and pin description of a standard 25-pin D-shell connector.
Figure 3B:
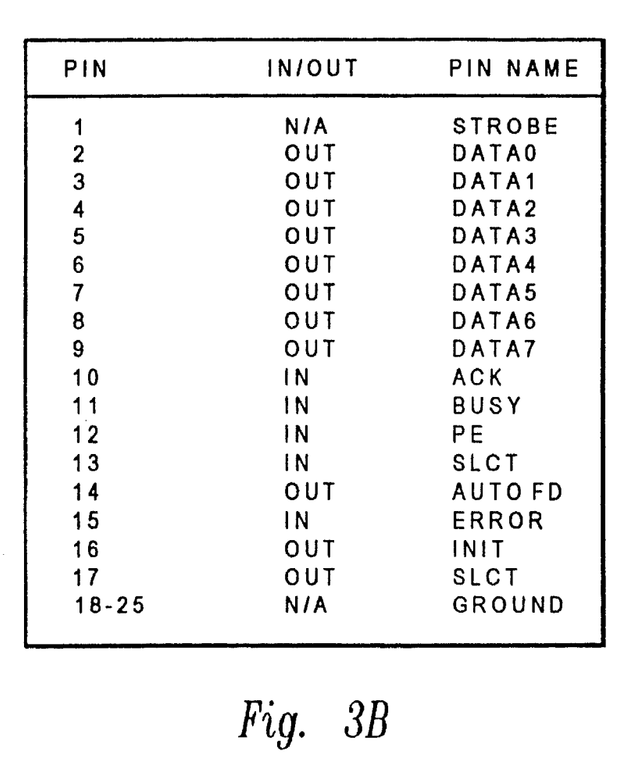

With reference now to FIGS. 3A and 3B, there is depicted a representation and pin description of a standard 25-pin D-shell connector. As illustrated in FIG. 3B, a standard 25-pin D-shell connector includes 8 data pins, 5 status pins, 8 ground pins, and 4 control lines. As is well-known in the art, these pin descriptions reflect the uni-directional parallel port data transfer protocol utilized to transfer data between a data processing system and printer, for example. A more detailed description of the standard signal definitions may be found in Winn L. Rosch, *Hardware Bible*, 3rd Ed., 1994.

Figure 4:
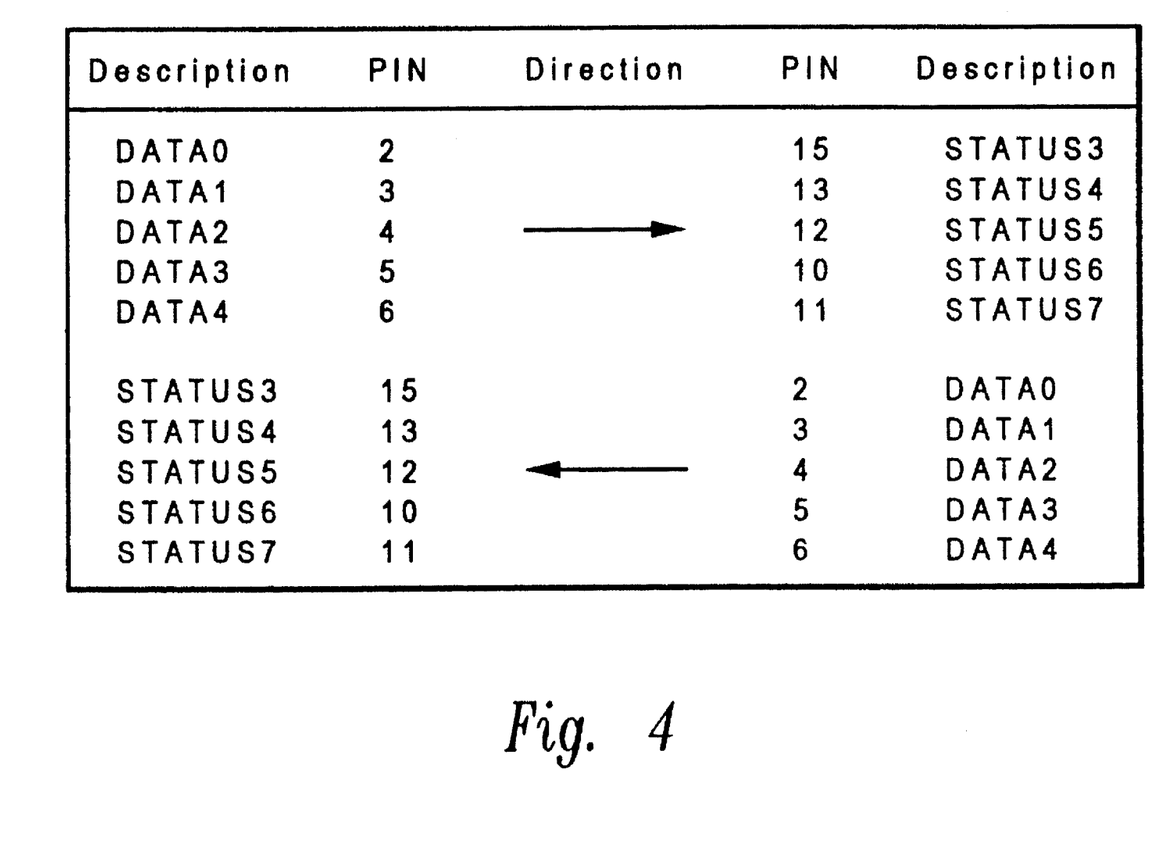
FIG. 4 depicts a pin description of a 25-pin D-shell connector according to a preferred embodiment of the present invention.

Referring now to FIG. 4, there is depicted the parallel port pin description of a preferred embodiment of the present invention. As described above, the standard parallel port includes 8 writable data lines and 5 readable status lines. According to the present invention, the data and status lines of a first data processing system are connected to the status and data lines, respectively, of a second data processing system. Because of the disparate number of data-out lines and status-in lines, there are many valid cable configurations. FIG. 4 illustrates one possible configuration in which the data-out lines (DATA0–DATA4) of each of the two data processing systems are connected to the status-in lines (STATUS3–STATUS7) of the other data processing system. This arrangement enables the transfer of 4 bits (a nibble) of information in either direction, with one bit reserved for handshaking. By convention, the handshake line is the BUSY line (Line 11) of the parallel port. When the handshake line is binary 0, the other 4 bits are data. When the handshake line is binary 1, the other 4 bits indicate status information.

As mentioned above, software is available which enables a user to transfer data between the standard parallel ports of two data processing systems without requiring additional hardware. Available software algorithms include the following steps:

(1) receiver indicates that it is ready to receive;
(2) sender drives data on the bus;
(3) sender toggles handshake line to indicate that the data is valid;
(4) receiver reads the data and acknowledges the receipt of data by setting the appropriate status bit; and
(5) sender terminates the data valid signal to acknowledge the completion of the transfer (i.e., data no longer valid).

Steps 3, 4, and 5 comprise a 3 step handshaking protocol in which the sender indicates that the data is valid, the receiver indicates that the data has been received, and the sender indicates that the data is no longer valid in response to the receiver's acknowledgement. This 3 step handshaking protocol is utilized to synchronize the execution of the data transfer operation at the completion of each step since the sending and receiving data processing systems may have diverse operating speeds. Although this protocol does provide synchronization between data processing systems with diverse operating speeds, it is inefficient since each of the three steps in the handshaking protocol requires a port I/O operation. As described above, port I/O operations execute slowly since they are tied to the clock rate of the transmitting system's bus, which may be much slower the execution speed of the microprocessor.

Figure 5:
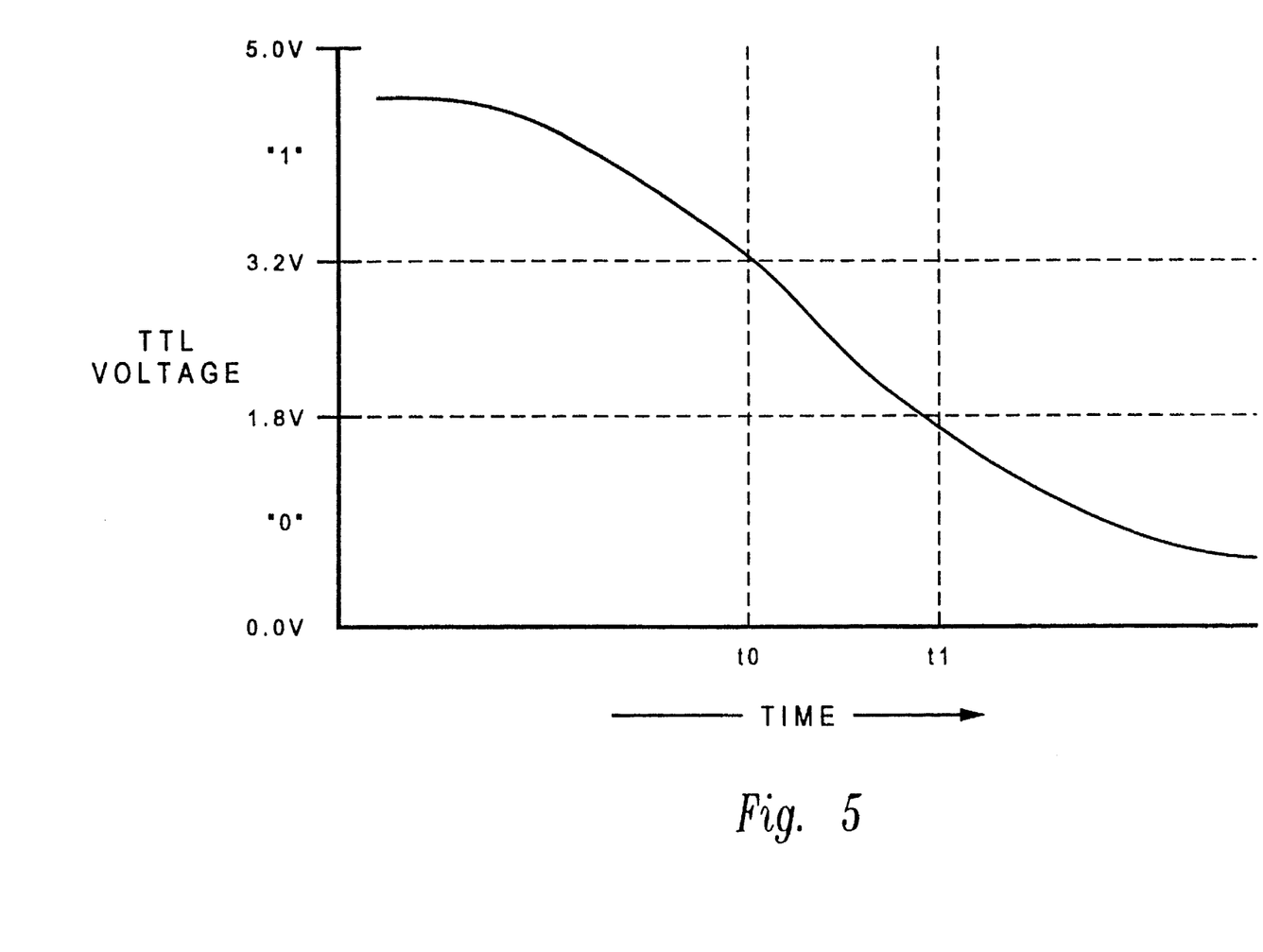
FIG. 5 illustrates a TTL logic state transition as a function of time.

In addition to synchronization, prior art systems utilize the described three step handshaking protocol to ensure that data is valid when the sending data processing system signals that the data is valid to read. FIG. 5 illustrates the voltage level of a parallel port data line as a function of time. Since standard parallel ports utilize TTL logic, a parallel line having a voltage 3.2 V and 5.0 V is translated as a logical "1" and a line having a voltage level between 1.8 V and 0.0 V is translated as a logical "0"; between times $t_0$ and $t_1$, the data is indeterminate. Consequently, in order to guarantee that the data is valid when indicated by a "data valid" signal, the sender drives the data on the bus in a port I/O operation prior to signaling that the data is valid. The delay between the two port I/O operations enables the data line values to settle before the receiving system reads them. That is, the delay ensures that the voltage levels of the data lines will be less than 1.8 V or greater than 3.2 V when read by the receiving system. In prior art systems, the data cannot be guaranteed to be valid without this delay since the data lines settle independently of, and therefore possibly more slowly than, the handshaking signal.

Figure 6:
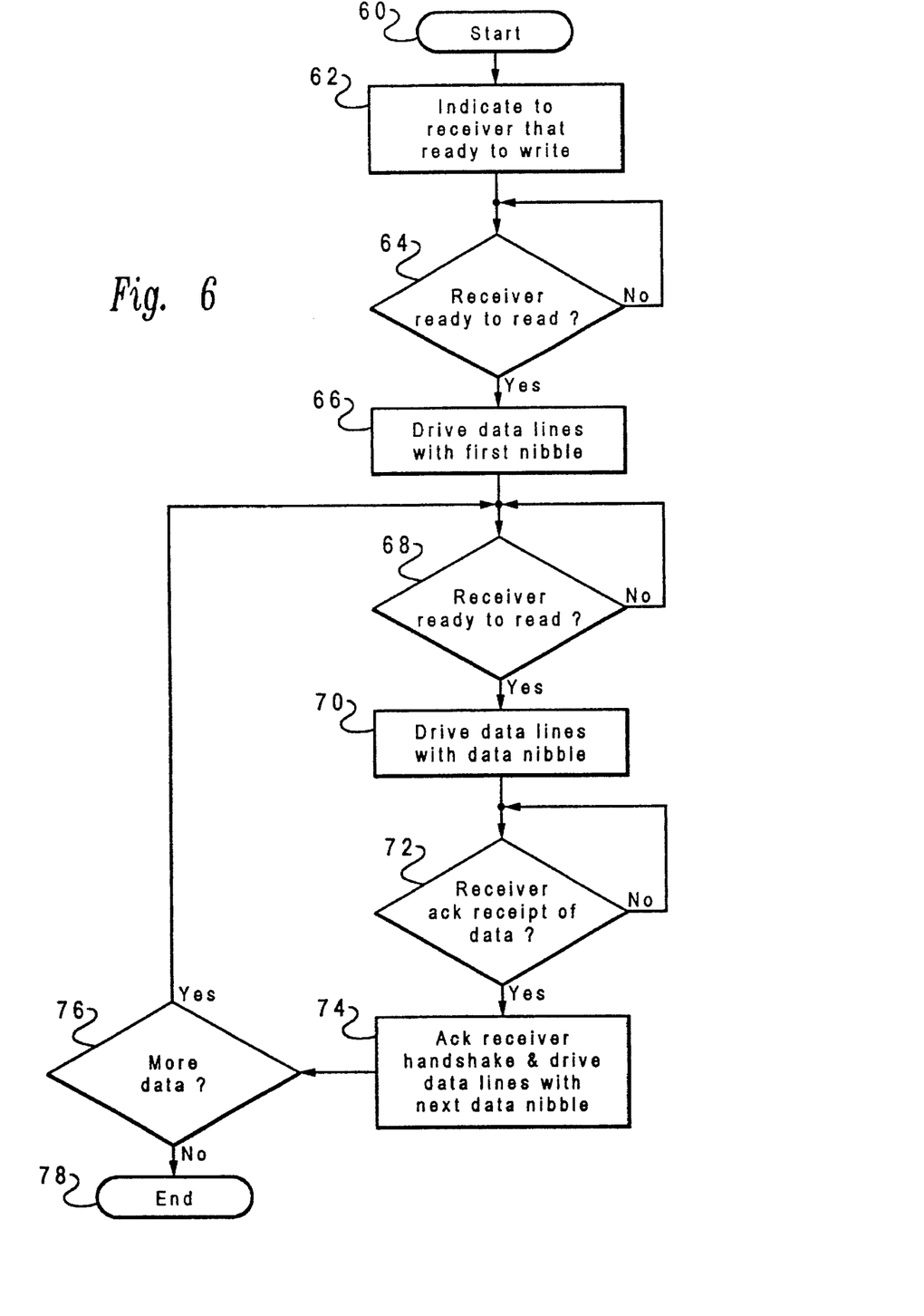
FIG. 6 is a flowchart depicting the method of data transfer of the present invention.
Figure 7:
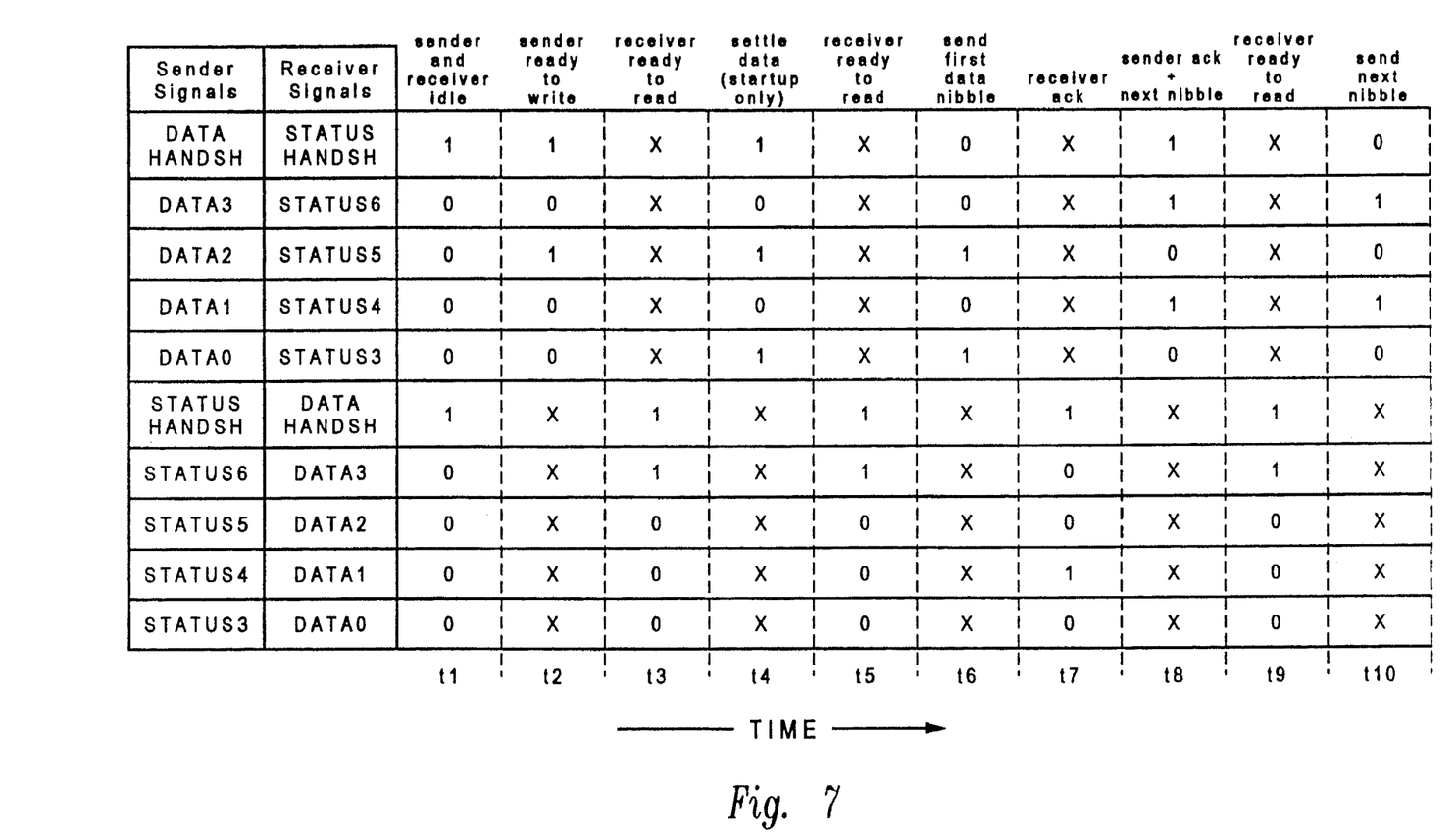
FIG. 7 illustrates a timing diagram of a parallel port data transfer according to the method of the present invention depicted in FIG. 6.

Referring now to FIGS. 6 and 7, there is depicted a flowchart and timing diagram which illustrate the efficient method of parallel port data transfer employed by the present invention. In the depicted example, the sending data processing system transfers the data byte A5h to the receiving data processing system. According to the present invention, the number of software executed steps required to transfer data between the parallel ports of two data processing systems is reduced from 5 to 4 by combining steps 2 and 3 of the above-enumerated steps. Thus, the sending data processing system places data on the bus and indicates that the data is valid in a single port I/O write operation.

As will be described, even though the data and the "data valid" handshaking signal are transmitted in a single I/O port operation, the method of the present invention guarantees that the data is valid by driving the data lines to the value required for next data nibble during the acknowledgment that the transfer of the current data nibble is complete (i.e., data no longer valid). Driving the data bits required for the next data transfer during the "data invalid" handshaking step guarantees that the data will be valid since the data lines are already at or near the required voltage levels when the sending system transmits the data. Although the sending data processing system drives the data lines with data during the "data invalid" handshaking step, the receiving data processing system ignores the data line values since the handshake bit is asserted.

As illustrated in FIG. 6, the process begins in block 60. Block illustrates time $t_1$ of FIG. 7, in which both the sending and receiving systems transmit idle signals. In this state neither of the sending or receiving data processing systems are sending or receiving data. The process then proceeds to block 62, which depicts the sender indicating at time $t_2$ that the sender is ready to write data. In the preferred embodiment of the present invention illustrated in FIG. 7, status information is indicated by the logical values depicted in Table 1. As will be recognized by those skilled in the art, the assignment of status values is arbitrary.

TABLE 1

| STATUS | VALUES | DESCRIPTION |
| --- | --- | --- |
| STATE_BUSY | 10000 | idle |
| STATE_READ | 11000 | read mode |
| STATE_WRITE | 10100 | write mode |
| STATE_DATARECV | 10010 | read mode & data received |

The process then proceeds to block 64, which illustrates the sender polling to determine if the receiver is ready to read data. The sender polls at block 64 until the receiver indicates that it is ready to read data, as illustrated at time $t_3$ of FIG. 7. Thereafter, the process proceeds to block 66, which depicts the sender driving the first data nibble ("5") in order to insure that the data lines settle to valid values prior to the receiver reading the data. The receiver does not read the values of the data lines since the handshake bit is set to 1 as is illustrated at time $t_4$. The step depicted at block 66 is performed only at the beginning of a data transmission and is not performed during the transmission of subsequent nibbles of data.

Next, the process proceeds to block 68, which illustrates the sender polling to determine if the receiver is ready to read data. Until the receiver indicates that it is ready to read data, the process repeats block 68. When the receiver indicates that it is ready to read data as illustrated at time $t_5$ of FIG. 7, the process then proceeds to block 70, which illustrates the sender driving the data on the bus. Because the data nibble ("5") is driven with the handshake signal low to indicate that the data is valid, the receiver reads the data. The process then proceeds to block 72 in which the sender polls for an acknowledge signal from the receiver. The process repeats block 72 until an acknowledgement signal is received. When an acknowledgement is received from the receiver as depicted at time $t_7$, the process proceeds to block 74.

Block 74 depicts the sender acknowledging receipt of the receiver's handshake by driving the handshake line high. In addition, the sender drives the data lines with the next data nibble, if any, as illustrated at time $t_8$ of FIG. 7. By driving the data lines with the next nibble of data during the sender acknowledgment step, the method of the present invention guarantees that the data will be valid during the next read by the receiving system. As illustrated, between the sender's acknowledgement ($t_8$) and the sender's transmission of the next nibble of data ($t_{10}$), the data lines do not make a state transition since the data lines are driven to the target values during the sender's acknowledgement. Because the handshake line makes a state transition from a 1 to a 0 during this same time interval, the data lines are guaranteed to settle to valid values before the handshake line, thereby ensuring that the data will be valid when read by the receiver.

Returning to FIG. 6, the process proceeds from block 74 to block 76, which depicts the sender determining if there are more data to transfer. If so, the process returns to block 68, which illustrates the sender polling to determine if the receiver is ready to receive more data. When the receiver indicates that it is ready to read more data, the sender transmits a second nibble of data, as depicted at block 70. Referring to FIG. 7, the timing diagram illustrates the transmission of the second nibble of data ("A") at time $t_{10}$ after the receiver has indicated that it is ready to receive the next nibble at time $t_9$. As described above, according to the present invention the data nibble transmitted at time $t_{10}$ was earlier transmitted at time $t_8$ in conjunction with a data invalid handshaking signal to ensure that the data is valid when read by the receiver. Returning to FIG. 6, the process continues to repeat blocks 68–76 until all data nibbles have been transferred. Thereafter, the process proceeds to block 78 where it terminates. Upon termination, the sender and receiver return to the idle state depicted at time $t_1$ of FIG. 7.

As has been described, the present invention provides an improved method of bi-directional data transfer between the standard parallel ports of two data processing systems. By eliminating a port I/O operation for each transfer cycle, the present invention provides a significant increase in throughput as compared with prior art systems. The performance enhancement provided by the present invention becomes significant as the amount of data transferred increases since the handshaking step must be performed twice for each byte or 128,000 times for each 64 K of data transferred. Although the present invention has been described in reference to a preferred embodiment in which utilizes two IBM PC-compatible personal computers, those skilled in the art will appreciate that the present invention could be utilized to transfer data between other data processing systems having parallel port interfaces compatible with the standard parallel port. Such systems include Intel-based personal computers with ISA and MCA bus architectures, IBM RISC System/6000 computers, and PowerPC-based data processing systems.

While the invention has been particularly shown and described with reference to a preferred embodiment, it will be understood by those skilled in the art that various changes in form and detail may be made therein without departing from the spirit and scope of the invention.

I claim:

1. A method of bi-directional data transfer via an electrical connection coupled between a standard parallel port of a first data processing system and a standard parallel port of a second data processing system, said method comprising the steps of:

signaling said first data processing system that said second data processing system is ready to receive data;

transmitting a first packet of data to said second data processing system in conjunction with an indication that said first packet of data is valid to read;

reading said first packet of data utilizing said second data processing system;

transmitting an acknowledgment signal to said first data processing system indicating that said second data processing system has received said first packet of data;

in response to said acknowledgment signal, transmitting a subsequent packet of data to said second data processing system in conjunction with an indication that said first packet of data is no longer valid to read, wherein said subsequent packet of data and said indication that said first packet of data is no longer valid to read are output by said first data processing system in a single write operation; and thereafter, transmitting to said second data processing system an indication that said subsequent packet of data is valid to read.

2. The method of bi-directional data transfer of claim 1, and further comprising the steps of:

prior to each data transfer, performing, prior to said step of signaling said first data processing system that said second data processing system is ready to receive data, the steps of:

signaling said second data processing system that said first data processing system is ready to transmit data;

signaling said first data processing system that said second data processing system is ready to receive data; and transmitting said first packet of data to said second data processing system in conjunction with an indication that said first packet of data is invalid so that said first packet of data will be valid when subsequently transmitted in conjunction with an indication that said first packet of data is valid to read.

3. The method of bi-directional data transfer of claim 1, and further comprising the step of:

subsequent to said step of transmitting a subsequent packet of data to said second data processing system, terminating said data transfer by transmitting an idle signal to said second data processing system.

4. A system for bi-directional data transfer, comprising:

a first and a second data processing system;

an electrical connection coupled between a standard parallel port of said first data processing system and a standard parallel port of said second data processing system;

means for signaling said first data processing system that said second data processing system is ready to receive data;

means for transmitting a first packet of data to said second data processing system in conjunction with an indication that said first packet of data is valid to read;

means for reading said first packet of data utilizing said second data processing system;

means for transmitting an acknowledgment signal to said first data processing system indicating that said second data processing system has received said first packet of data;

means, responsive to said acknowledgment signal, for transmitting a subsequent packet of data to said second data processing system in conjunction with an indication that said first packet of data is no longer valid to read, wherein said subsequent packet of data and said indication that said first packet of data is no longer valid to read are output by said first data processing system in a single write operation; and means for thereafter transmitting to said second data processing system an indication that said subsequent packet of data is valid to read.

5. The system for bi-directional data transfer of claim 4, and further comprising:

means for initiating a data transfer, prior to signaling said first data processing system that said second data processing system is ready to receive data, including:

means for signaling said second data processing system that said first data processing system is ready to transmit data;

means for signaling said first data processing system that said second data processing system is ready to receive data; and means for transmitting said first packet of data to said second data processing system in conjunction with an indication that said first packet of data is invalid, thereby ensuring that said first data packet will be valid when subsequently transmitted in conjunction with an indication that said first packet of data is valid to read.

6. The system for bi-directional data transfer of claim 4, and further comprising:

means for terminating said data transfer, subsequent to said step of transmitting a subsequent packet of data to said second data processing system, by transmitting an idle signal to said second data processing system.

7. The system for bi-directional transfer of claim 4, wherein said first and said second data processing systems are IBM PC-compatible personal computers.

8. The system for bi-directional data transfer of claim 4, wherein said electrical connection coupled between said first and said second data processing systems comprises a standard 25-pin printer cable.

9. The system for bi-directional data transfer of claim 4, wherein said first and said second packets of data comprise 4 bits of data.

* * * * *